D. HILL.
NUT LOCK.
APPLICATION FILED JAN. 17, 1912. RENEWED SEPT. 2, 1914.
1,135,899.
Patented Apr. 13, 1915.
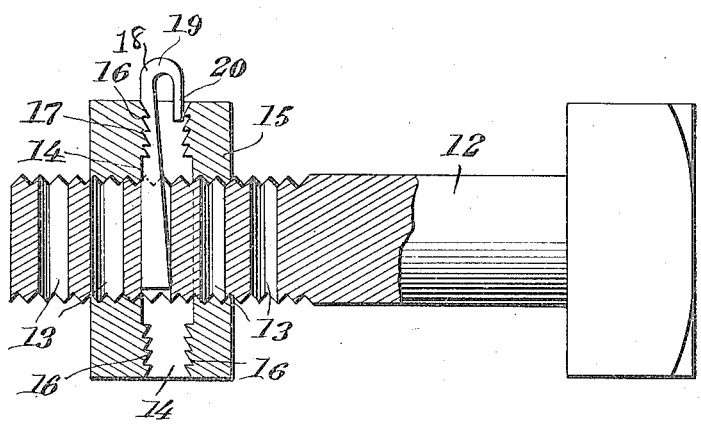
Inventor
Dock Hill
Witnesses
By Victor J. Evans
Attorney

UNITED STATES PATENT OFFICE.

DOCK HILL, OF ROME, GEORGIA.

NUT-LOCK.

1,135,899. Specification of Letters Patent. Patented Apr. 13, 1915.

Application filed January 17, 1912, Serial No. 671,629. Renewed September 2, 1914. Serial No. 859,903.

*To all whom it may concern:*

Be it known that I, DOCK HILL, a citizen of the United States, residing at Rome, in the county of Floyd and State of Georgia, have invented new and useful Improvements in Nut-Locks, of which the following is a specification.

This invention relates to nut locks, and has for an object to provide a device of this character wherein the nut will be positively held against retrograde movement on the bolt.

In the drawing, forming a portion of this specification and in which like numerals of reference indicate similar parts in the drawing: The invention as illustrated is a longitudinal section through the nut lock.

With reference to the form of invention shown herein the bolt has its shank 12 provided with a series of transverse openings 13 with which similar openings 14 in the nut 15 may be brought into registration on the required adjustment of the latter as will be understood. The walls of the opening are provided with teeth or serrations 16 which are adapted to be engaged by the teeth 17 on the movable portion of the locking device or key 18. This key has its movable portion folded on itself, at 19, and the terminal 20 is extended into the slot 14 so as to hold the key against disengagement from the teeth of the nut when the latter is in its adjusted position. When it is desired to remove the nut from the bolt the terminal 20 of the key is withdrawn from the opening 14 and the movable portion of the key is moved manually to its released position from the teeth of the nut.

I claim:

A nut lock comprising a bolt, a nut adjustable thereon and provided with an opening, the walls of the opening having a toothed portion, a key extending through the opening and adapted for locking engagement with the bolt, the said key having a movable toothed portion adapted for engagement with the toothed portion of the opening in the nut, and foldable means on the key removably extended into the opening in the nut and adapted to hold the toothed portion of the key positively engaged with the toothed portion of the nut.

In testimony whereof I affix my signature in presence of two witnesses.

DOCK HILL.

Witnesses:
   J. W. C. HARRIS,
   J. H. HARRIS.

Copies of this patent may be obtained for five cents each, by addressing the "Commissioner of Patents, Washington, D. C."